United States Patent
Uzkan et al.

(10) Patent No.: US 9,074,492 B2
(45) Date of Patent: Jul. 7, 2015

(54) ENERGY RECOVERY ARRANGEMENT HAVING MULTIPLE HEAT SOURCES

(75) Inventors: Teoman Uzkan, Indian Head Park, IL (US); Thomas G. Gallagher, Plainfield, IL (US)

(73) Assignee: Electro-Motive Diesel, Inc., LaGrange, IL (US)

(*) Notice: Subject to any disclaimer, the term of this patent is extended or adjusted under 35 U.S.C. 154(b) by 589 days.

(21) Appl. No.: 13/459,729

(22) Filed: Apr. 30, 2012

(65) Prior Publication Data

US 2013/0283784 A1 Oct. 31, 2013

(51) Int. Cl.
*F01K 23/10* (2006.01)
*F02G 3/00* (2006.01)
(Continued)

(52) U.S. Cl.
CPC ............. *F01K 13/00* (2013.01); *Y02T 10/16* (2013.01); *F01K 23/10* (2013.01); *F02B 37/00* (2013.01); *F01K 23/065* (2013.01); *F01K 25/08* (2013.01);
(Continued)

(58) Field of Classification Search
CPC ......... F01K 13/00; F01K 23/00; F01K 23/10; F01K 3/20; F01K 11/00; F01K 11/02; F01K 11/04; F02B 37/00; F02B 37/013; F02B 29/0412; F02B 29/0475; F02M 25/0709; F02M 25/0715; F02M 25/0726; Y02T 10/16; Y02T 10/144
USPC ........ 60/618, 616, 612, 605.2, 651, 670–671; 123/568.12
IPC .............. F01K 23/10; F02M 25/07; F02G 5/02, F02G 5/04
See application file for complete search history.

(56) References Cited

U.S. PATENT DOCUMENTS

| 4,342,921 A | 8/1982 | Williams |
| 4,351,155 A | 9/1982 | Anderson et al. |

(Continued)

FOREIGN PATENT DOCUMENTS

| CA | 2509450 | 8/2005 | |
| EP | 2180171 A1 * | 4/2010 | ................ F02G 5/02 |

(Continued)

OTHER PUBLICATIONS

D. Wei et al., "Dymanic Modeling and Simulation of an Organic Rankine Cycle for Waste Heat Recovery", *Applied Thermal Engineering* (2008), vol. 28, Issue 10.

(Continued)

*Primary Examiner* — Thai Ba Trieu
(74) *Attorney, Agent, or Firm* — Finnegan, Henderson, Farabow, Garrett & Dunner, LLP (57) ABSTRACT

An energy recovery arrangement is disclosed for use with an engine. The energy recovery arrangement may include a closed circuit containing a high-pressure working fluid, a first boiler configured to receive waste heat from a first source on the engine, and a second boiler disposed upstream of the first boiler and configured to receive waste heat from a second source on the engine. The energy recovery arrangement may also include an energy extractor disposed at a location downstream of the first and second boilers, a condenser disposed at a location downstream of the energy extractor, and a pump disposed at a location downstream of the condenser and upstream of the first and second boilers. The energy recovery arrangement may further include a recuperator disposed in parallel with the second boiler and configured to transfer heat from working fluid exiting the extractor to working fluid exiting the pump.

18 Claims, 5 Drawing Sheets

(51) Int. Cl.
  *F02B 33/44* (2006.01)
  *F02M 25/07* (2006.01)
  *F01K 25/08* (2006.01)
  *F01K 25/00* (2006.01)
  *F01K 23/06* (2006.01)
  *F01K 13/00* (2006.01)
  *F02B 37/00* (2006.01)
  *F01N 5/02* (2006.01)
  *F02G 5/04* (2006.01)
  *F02B 37/013* (2006.01)

(52) U.S. Cl.
  CPC .. *F01N 5/02* (2013.01); *F02G 5/04* (2013.01); *F02B 37/013* (2013.01); *Y02T 10/166* (2013.01)

(56) References Cited

U.S. PATENT DOCUMENTS

| | | | |
|---|---|---|---|
| 4,393,656 | A | 7/1983 | Anderson et al. |
| 4,516,403 | A | 5/1985 | Tanaka |
| 4,896,830 | A | 1/1990 | Takamatsu |
| 4,901,531 | A | 2/1990 | Kubo et al. |
| 4,911,110 | A | 3/1990 | Isoda et al. |
| 5,548,958 | A | 8/1996 | Lewis |
| 7,056,251 | B2 | 6/2006 | Ibaraki |
| 7,104,063 | B2 | 9/2006 | Clemens |
| 7,721,543 | B2 * | 5/2010 | Massey et al. ............. 60/618 |
| 7,997,080 | B2 | 8/2011 | Harmon, Sr. et al. |
| 8,061,140 | B2 | 11/2011 | Harmon, Sr. |
| 8,096,124 | B2 | 1/2012 | Pierpont et al. |
| 8,302,399 | B1 * | 11/2012 | Freund et al. ............. 60/618 |
| 2008/0041046 | A1 | 2/2008 | Bering |
| 2009/0199556 | A1 | 8/2009 | Forner, Sr. et al. |
| 2011/0088671 | A1* | 4/2011 | Johnson ............. 123/568.12 |
| 2011/0094485 | A1* | 4/2011 | Vuk et al. ............. 60/605.2 |
| 2011/0192163 | A1 | 8/2011 | Kasuya |
| 2011/0209473 | A1* | 9/2011 | Fritz et al. ............. 60/618 |
| 2012/0023946 | A1 | 2/2012 | Ernst et al. |
| 2012/0042656 | A1* | 2/2012 | Donnelly et al. ............. 60/772 |
| 2012/0192560 | A1* | 8/2012 | Ernst et al. ............. 60/616 |
| 2013/0199178 | A1* | 8/2013 | Kanou et al. ............. 60/605.2 |
| 2014/0116374 | A1* | 5/2014 | Brown ............. 60/605.2 |
| 2015/0027118 | A1* | 1/2015 | Tricaud et al. ............. 60/624 |

FOREIGN PATENT DOCUMENTS

| | | | | | |
|---|---|---|---|---|---|
| JP | 54106745 | A | * | 8/1979 | ............. F01K 25/00 |
| JP | 07280206 | A | * | 10/1995 | ............. F02D 11/00 |
| JP | 2002038907 | A | * | 2/2002 | ............. F01K 23/14 |
| JP | 2004316439 | A | * | 11/2004 | ............. F01K 23/02 |
| JP | 2007255278 | A | * | 10/2007 | ............. F02M 25/07 |
| JP | 2010102619 | A | * | 5/2010 | ............. F02G 5/02 |
| JP | 2012077630 | A | * | 4/2012 | ............. F02G 5/02 |
| WO | WO 2011012047 | A1 | * | 2/2011 | ............. F01K 23/04 |
| WO | WO 2012007359 | A1 | * | 1/2012 | ............. F02G 5/02 |

OTHER PUBLICATIONS

R. Chacartegui et al., "Alternative ORC Bottoming Cycles for Combined Cycle Power Plants", *Applied Energy*, (2009), vol. 86, Issue 10.

I. Vaja, Internal Combustion Engine (ICE) Bottoming with Organic Rankin Cycles (ORCs), *Energy* (2010), vol. 35, Issue 2.

Tai Anh Duong, "Heat Waste Recovery System from Exhaust Gas of Diesel Engine to a Reciprocal Steam Engine", The University of Texas at Austin (2011).

Quazi Hussain et al., "Directions in Engine-Efficiency and Emissions Research (DEER) 2011 Conference", Organic Rankine Cycle for Light Duty Passenger Vehicles, Research Advanced Engineering Ford Motor Company (2011).

Thomas Frey, "Waste Heat Recovery—The Hidden Source of Energy", http://ge.geglobalresearch.com/blog/waste-heat-recovery-the-hidden-source-of-energy (Jun. 2009).

BusinessWire Press Release, "Opcon Signs Co-Operation Agreement with MAN Diesel & Turbo", AMÅL, Sweden (2009).

Thomas E. Briggs et al., "Performance of an Organic Rankine Cycle Waste Heat Recovery System for Light Duty Diesel Engines", U.S. Department of Energy.

Tom Howell et al., Volvo "Development of an ORC System to Improve HD Truck Fuel Efficiency", www.ricrado.com (2011).

Rakesh Aneja et al., Daimler "Exhaust Heat Driven Rankine Cycle for a Heavy Duty Diesel Engine", U.S. Department of Energy, Directions in Engine-Efficiency and Emissions Research Conference, Deer 2011 Detroit.

* cited by examiner

ENERGY RECOVERY ARRANGEMENT HAVING MULTIPLE HEAT SOURCES

TECHNICAL FIELD

The present disclosure is directed to an energy recovery arrangement and, more particularly, to an energy recovery arrangement having multiple heat sources.

BACKGROUND

Internal combustion engines such as diesel engines, gasoline engines, and gaseous fuel-powered engines combust a mixture of fuel and air to generate a mechanical power output that can be used in many different ways for a variety of purposes. Unfortunately, conventional engines are inefficient and much of the energy of the fuel is wasted in the form of heat. For example, heat can be generated during compression of combustion air directed into the engine or during pumping of fluids (e.g., fuel, air, lubricant, etc.) through the engine. Additional heat is generated directly from combustion of the fuel and air, and is transferred to the engine block and to fluids (oil, coolant, exhaust, etc.) circulating through the engine. Most of this heat energy is generally discharged or otherwise dissipated to the environment.

In addition to efficiency losses associated with heat generation, extra energy must be expended to protect components of the engine from the heat and/or to keep performance of the engine from declining due to the heat. For example, the inlet air must be chilled, coolant must be circulated through the engine block, engine oil must be cooled, and exhaust temperatures may need to be lowered in order to adequately protect the engine and/or to ensure desired engine performance. Each of these actions requires extra energy, which reduces the mechanical power output of the engine and further lowers its efficiency.

One attempt to recover heat energy for an engine is disclosed in U.S. Patent Publication 2012/0023946 of Ernst et al. that published on Feb. 2, 2012 ("the '946 publication"). Specifically, the '946 publication discloses a diesel engine equipped with an Organic Rankine Cycle system (ORCS). The ORCS includes one or more boilers disposed in series or parallel that are configured to receive heat from an exhaust gas recirculation (EGR) loop and from charge air. The boilers are adapted to transfer the heat to a working fluid to vaporize the fluid. The ORCS also includes a turbine fluidly coupled to the boilers and adapted to covert energy in the vaporized working fluid to electricity, a condenser adapted to receive the working fluid from the turbine and condense the working fluid, and a pump adapted to move the working fluid from the condenser into the boilers. The ORCS also includes a recuperator adapted to transfer heat remaining in the working fluid at a location downstream of the turbine to the working fluid at a location upstream of the boilers. With this system, some of the otherwise wasted heat from the diesel engine can be recovered.

Although the ORCS of the '946 publication may improve engine efficiency through heat recovery, it may still be less than optimal. In particular, the series location of the recuperator relative to the boiler(s) may result in a reduced amount of thermal transfer to the working fluid and, hence, a reduced amount of recovered energy.

The energy recovery arrangement of the present disclosure solves one or more of the problems set forth above and/or other problems of the prior art.

SUMMARY

In one aspect, the disclosure is directed toward an energy recovery arrangement for an engine. The energy recovery arrangement may include a closed circuit containing a high-pressure working fluid, a first boiler disposed within the closed circuit and configured to receive waste heat from a first source on the engine, and a second boiler disposed within the closed circuit at a location upstream of the first boiler and configured to receive waste heat from a second source on the engine. The energy recovery arrangement may also include an energy extractor disposed within the closed circuit at a location downstream of the first and second boilers, a condenser disposed within the closed circuit at a location downstream of the energy extractor, and a pump disposed within the closed circuit at a location downstream of the condenser and upstream of the first and second boilers. The energy recovery arrangement may further include a recuperator disposed within the closed circuit in parallel with the second boiler and configured to transfer heat from working fluid exiting the extractor to working fluid exiting the pump.

In another aspect, the disclosure is directed toward a method of recovering energy. The method may include pressurizing a working fluid, directing the pressurized working fluid through a low-temperature boiler and a high-temperature boiler in series to vaporize the working fluid, and extracting energy from the vaporized working fluid. The method may also include transferring heat from the vaporized working fluid to the pressurized working fluid at a location upstream of the high-pressure boiler and in parallel with the directing of pressurized working fluid through the low-temperature boiler, and condensing the working fluid after extracting the energy.

DETAILED DESCRIPTION

Figure 1:
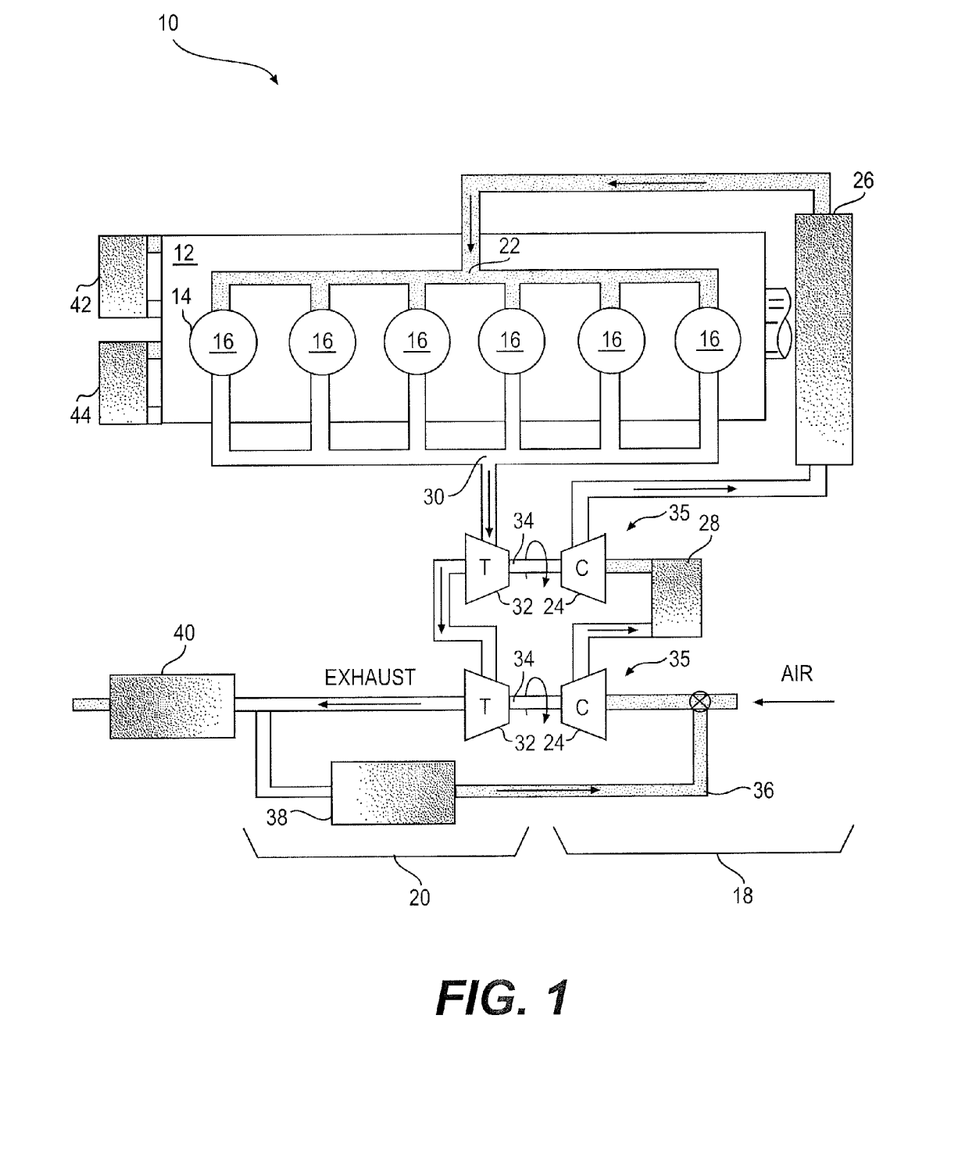
FIG. 1 is a schematic illustration of an exemplary disclosed engine.

FIG. 1 illustrates an exemplary power system 10. For the purposes of this disclosure, power system 10 is depicted and described as a two-stroke diesel engine. One skilled in the art will recognize, however, that power system 10 may be any other type of combustion engine such as, for example, a four-stroke diesel engine or a two- or four-stroke gasoline or gaseous fuel-powered engine. Power system 10 may include, among other things, an engine block 12 that at least partially defines a plurality of cylinders 14. A piston (not shown) may be slidably disposed within each cylinder 14 to reciprocate between a top-dead-center position and a bottom-dead-center position, and one or more cylinder heads (not shown) may be connected to engine block 12 to close off an end of each cylinder 14. Each cylinder 14, piston, and cylinder head may together define a combustion chamber 16. In the illustrated embodiment, power system 10 includes six such combustion chambers 16. However, it is contemplated that power system 10 may include a greater or lesser number of combustion chambers 16 and that combustion chambers 16 may be disposed in an "in-line" configuration, in a "V" configuration, in an opposing-piston configuration, or in any other conventional configuration. Power system 10 may be equipped with an air induction system 18 and an exhaust system 20 that direct fluids into and out of combustion chambers 16.

Air induction system 18 may include components configured to introduce charged air into combustion chambers 16. For example, air induction system 18 may include an induction manifold 22 fluidly connected along its length to each combustion chamber 16, one or more compressors 24 in fluid communication with an end of induction manifold 22, and, in some embodiments, an aftercooler 26 and/or an intercooler 28 located downstream of and/or in-between compressors 24. It is contemplated that additional components may be included within air induction system 18, if desired, such as valving, one or more air cleaners, one or more waste gates, a control system, a bypass circuit, and other means for conditioning and introducing charged air into power system 10. It is also contemplated that aftercooler 26 and/or intercooler 28 may be omitted, if desired.

In the disclosed embodiment, each compressor 24 of power system 10 is a fixed geometry centrifugal-type compressor that is mechanically driven to compress air flowing into combustion chambers 16 to a predetermined pressure level. It is contemplated, however, that another type of compressor may alternatively or additionally be used in conjunction with power system 10, if desired. Compressors 24, if more than one is included within air induction system 18, may be disposed in a series (shown in FIG. 1) or parallel relationship and fluidly connected to power system 10 via induction manifold 22.

Aftercooler 26 and intercooler 28 may both embody air-to-air heat exchangers, air-to-liquid heat exchangers, or combinations of both, and be configured to facilitate the transfer of thermal energy away from the compressed air directed into combustion chambers 16 of power system 10. The thermal energy transferred away from the compressed air may be absorbed into a flow of low-pressure coolant, for example air, glycol, water, a water/glycol mixture, a blended air mixture, or another coolant known in the art. Aftercooler 26 may be disposed between compressors 24 and engine block 12, while intercooler 28 may be disposed between compressors 24.

Exhaust system 20 may be configured to direct exhaust from combustion chambers 16 to the atmosphere. For example, exhaust system 20 may include an exhaust manifold 30 fluidly connected along its length to combustion chambers 16, and one or more turbines 32 in fluid communication with an end of exhaust manifold 30. Turbines 32, if more than one is included within exhaust system 20, may be connected in a series (shown in FIG. 1) or parallel relationship.

Each turbine 32 of exhaust system 20 may be mechanically connected to one or more compressors 24 of air induction system 18 by way of a shaft 34 to form a turbocharger 35. As the hot exhaust gases exiting combustion chambers 16 move through exhaust manifold 30 into turbines 32 and expand against blades thereof, turbines 32 may rotate and drive the connected compressors 24 to compress inlet air directed back into combustion chambers 16 via induction manifold 22.

In some embodiments, an exhaust gas recirculation (EGR) loop 36 may be connected between air induction and exhaust systems 18, 20. EGR loop 36 may allow a controlled amount of exhaust gas to be recycled within power system 10, thereby improving exhaust emissions, as is known in the art. In the disclosed embodiment, EGR loop 36 is a low-pressure loop having an inlet located downstream of turbines 32 and an outlet located upstream of compressors 24. It is contemplated, however, that EGR loop 36 could alternatively be a high-pressure loop (i.e., a loop having its inlet located upstream of turbines 32 and its outlet located upstream or downstream of compressors 24), if desired. It is further contemplated that other flow-promoting device (e.g., a blower, venturi, etc.) and/or an exhaust conditioning device (e.g., diesel oxidation catalyst, particulate filter, etc.) could be associated with EGR loop 36, if desired. It is also contemplated that a check valve, for example a reed-type check valve (not shown), may be situated within EGR loop 36, if desired, to provide for a unidirectional flow of exhaust into air induction system 18.

An EGR cooler 38 may be located within EGR loop 36 to cool the recycled exhaust gas before it enters air induction system 18. EGR cooler 38, like aftercooler 26 and intercooler 28, may be an air-to-air heat exchanger, an air-to-liquid heat exchanger, or a combination of both, and be configured to facilitate the transfer of thermal energy away from the recycled exhaust. The thermal energy transferred away from the recycled exhaust may be absorbed into a flow of low-pressure coolant, for example air, glycol, water, a water/glycol mixture, a blended air mixture, or another coolant known in the art. In some embodiments, an additional exhaust cooler 40, that is similar to EGR cooler 38, may be associated with a main flow of exhaust from power system 10 (i.e., the flow of exhaust not passing through EGR loop 36), if desired. Exhaust cooler 40 may be located upstream or downstream of the inlet to EGR loop 36.

Power system 10 may be equipped with even more coolers, if desired. For example, power system 10 may include, among others, an oil cooler 42 and a jacket water cooler 44. Oil cooler 42 may be a liquid-to-air or liquid-to-liquid type of cooler configured to transfer heat away from a lubricating oil of power system 10. Jacket water cooler 44 may also be a liquid-to-air or liquid-to-liquid type of cooler configured to transfer heat away from engine block 12. Other types of coolers may also or alternatively be used in conjunction with power system 10. The thermal energy transferred away from the lubricating oil and/or engine block 12 may be absorbed into a flow of low-pressure coolant, for example air, glycol, water, a water/glycol mixture, a blended air mixture, or another coolant known in the art.

Figure 2:
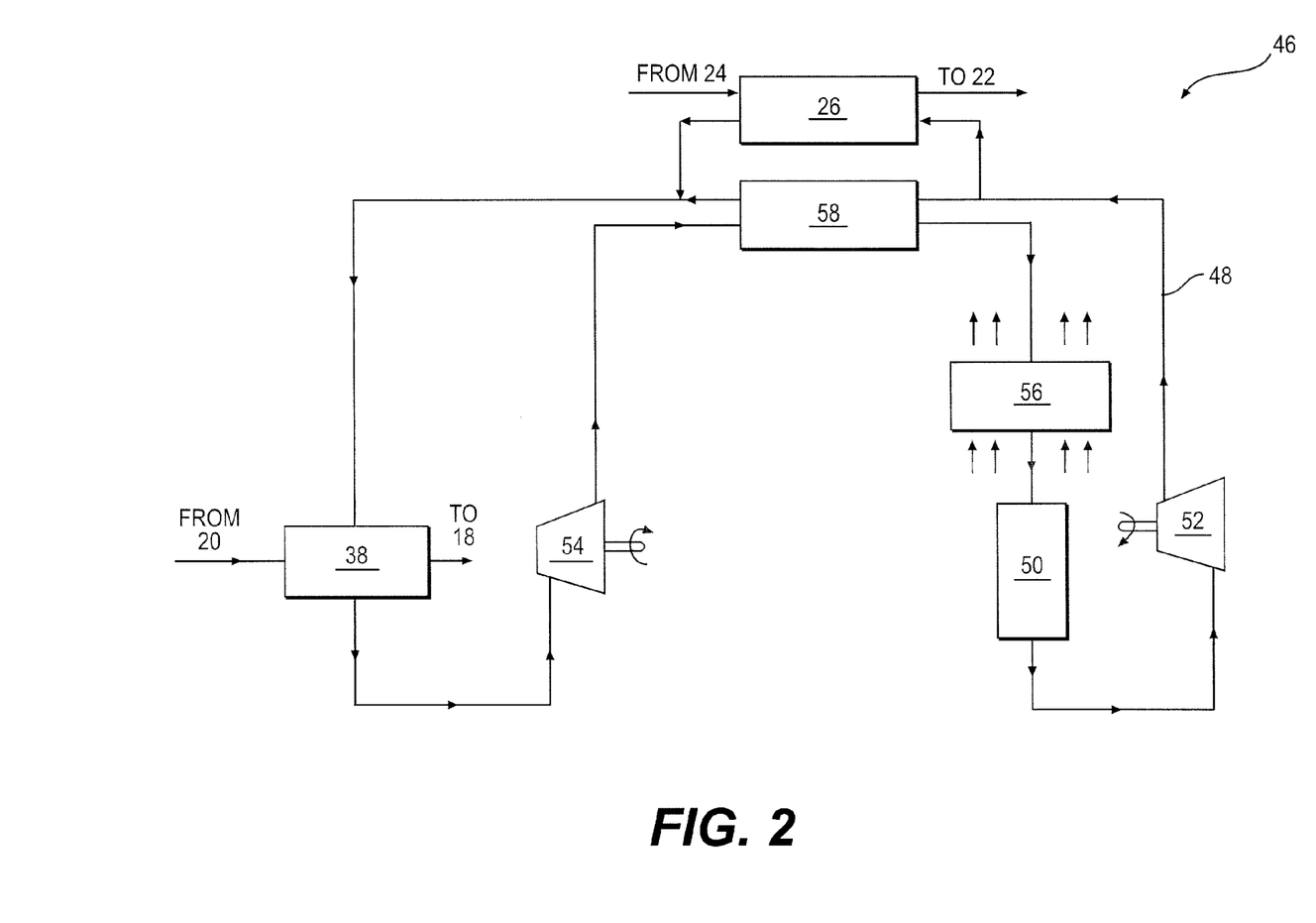
FIGS. 2-5 are schematic illustrations of exemplary disclosed energy recovery arrangements that may be used in conjunction with the engine of FIG. 1.

As shown in FIG. 2, an energy recovery arrangement (ERA) 46 may be associated with the different coolers of power system 10 and configured to recover some of the heat energy normally dissipated by these coolers to the atmosphere. ERA 46 may include, among other things, a closed high-pressure circuit 48 having a supply (e.g., a tank) 50 of working fluid, a pump 52, an energy extractor 54, and a condenser 56. The working fluid may be, for example, R-245fa, R-134, propane, nitrogen, helium, or another high-pressure coolant known in the art. Pump 52 may be located upstream of the various coolers of power system 10 and energy extractor 54, and downstream of condenser 56 and supply 50. Pump 52 may be configured to circulate the working fluid from supply 50 throughout circuit 48. As the working fluid passes through the coolers in liquid form, the coolers may function as boilers in ERA 46, imparting heat from their associated low-pressure coolants to the working fluid and causing the working fluid to boil and vaporize. This superheated vapor may then enter energy extractor 54, wherein heat energy in the vaporized working fluid is converted into a more useful form. After passing through energy extractor 54, the vaporized working fluid (now at a lower energy level and temperature) may then be passed through condenser 56, where it cools back to liquid state for collection in supply 50.

In the disclosed exemplary embodiment, pump 52 is a piston-type, variable-displacement pump. It is contemplated, however, that pump 52 could alternatively be a rotary and/or centrifugal type of pump having a fixed displacement, if desired. Pump 52 may be drivably connected to a crankshaft of power system 10 (e.g., by way of a gear train—not shown) or driven by an electric motor powered by power system 10. A check valve and/or pressure regulator or compensator (not shown) may be disposed within circuit 48 to provide for a unidirectional flow of fluid through pump 52 at a relatively constant pressure.

Energy extractor 54 may include components that convert heat energy to useful mechanical energy, electrical energy, hydraulic energy, pneumatic energy, or other form of energy. In the disclosed embodiment, energy extractor 54 includes a turbine (not shown) configured to generate mechanical or electrical energy subsequently utilized to increase an efficiency or capacity of power system 10. For example, mechanical or electrical energy generated by the turbine of energy extractor 54 may be directed back into power system 10 via a motor (not shown) connected to the crankshaft of power system 10. Additionally or alternatively, the energy generated by energy extractor 54 may be utilized to lower a demand for power from power system 10 by supplying auxiliary loads with mechanical and/or electrical power normally supplied by power system 10. Other uses for the energy from energy extractor 54 are also considered. It is contemplated that other types of energy extractors may alternatively be used, if desired, such as a piston-type motor, a thermal generator, or another device known in the art.

Condenser 56 may be any device known in the art that is configured to return the working fluid from a high-energy vapor state to a lower-energy liquid state. In the disclosed embodiment, condenser 56 may be a heat exchanger similar to the other coolers of power system 10, for example an gas-to-liquid or liquid-to-liquid heat exchanger. As a low-temperature, low-pressure coolant (e.g., air, glycol, water, a water/glycol mixture, a blended air mixture, or another coolant) passes through condenser 56, the vaporized working fluid entering condenser 56 may cool and transition back to its liquid state. Additionally or alternatively, condenser 56 may provide for an expansion of the vaporized working fluid that results in a temperature drop and associated transition from vapor to liquid.

In some embodiments, a recuperator 58 may be associated with circuit 48 to improve the efficiency of energy recovery system 46. Recuperator 58 may be located to transfer heat from the working fluid as it flows between energy extractor 54 and condenser 56 to the working fluid passing from pump 52 to the coolers of power system 10. This may result in less heat needing to be dissipated within condenser 56 (and allowing for a smaller capacity condenser), while also providing more heat to energy extractor 54. Recuperator 58 may be, for example, a liquid-to-liquid or gas-to-liquid heat exchanger.

The coolers of power system 10 (i.e., the boilers of ERA 46) may be arranged in several different ways relative to the flow of working fluid within circuit 48. FIG. 2 illustrates a first arrangement having two separate sources of heat. In this arrangement, aftercooler 26 is disposed in parallel with recuperator 58 and in series with EGR cooler 38. Aftercooler 26 may function as a low-temperature boiler disposed upstream of EGR cooler 38, which may function as a high-temperature boiler. The inlet temperature of the working fluid passing through aftercooler 26 may be about 100-150° F., while the outlet temperature of the working fluid may be about 200-300° F. At this same time, the inlet temperature of the working fluid passing through EGR cooler 38 may be about 300° F., while the outlet temperature of the working fluid may be about 500° F. The temperatures of the working fluid passing through recuperator 58 may range from about 200-450° F. In this arrangement, the working fluid passing through EGR cooler 38 may be about 2-3 times hotter than the working fluid passing through aftercooler 26, while the temperatures of aftercooler 26 and recuperator 58 may be more similar.

Because the amount of heat transfer between the low-pressure coolant and the working fluid within ERA 46 may be at least partially dependent on a temperature difference between the fluids, the greatest amount of heat transfer may occur when the lower-temperature boiler(s) (e.g., aftercooler 26 and recuperator 58) are located upstream of the high-temperature boiler(s) (e.g., EGR cooler 38), as is the case in the arrangement of FIG. 2. Further, because aftercooler 26 and recuperator 58 may be disposed in parallel, both coolers, functioning as boilers in ERA 46, may transfer a greater amount of heat without negative interaction, as compared with a series arrangement. In other words, a series arrangement of aftercooler 26 and recuperator 58 would reduce the effectiveness of the downstream boiler, as the upstream boiler having already warmed the working fluid would reduce a temperature difference in the working fluid experienced by the downstream boiler. The disclosed arrangement of FIG. 2 may not be effected in this way.

Figure 3:
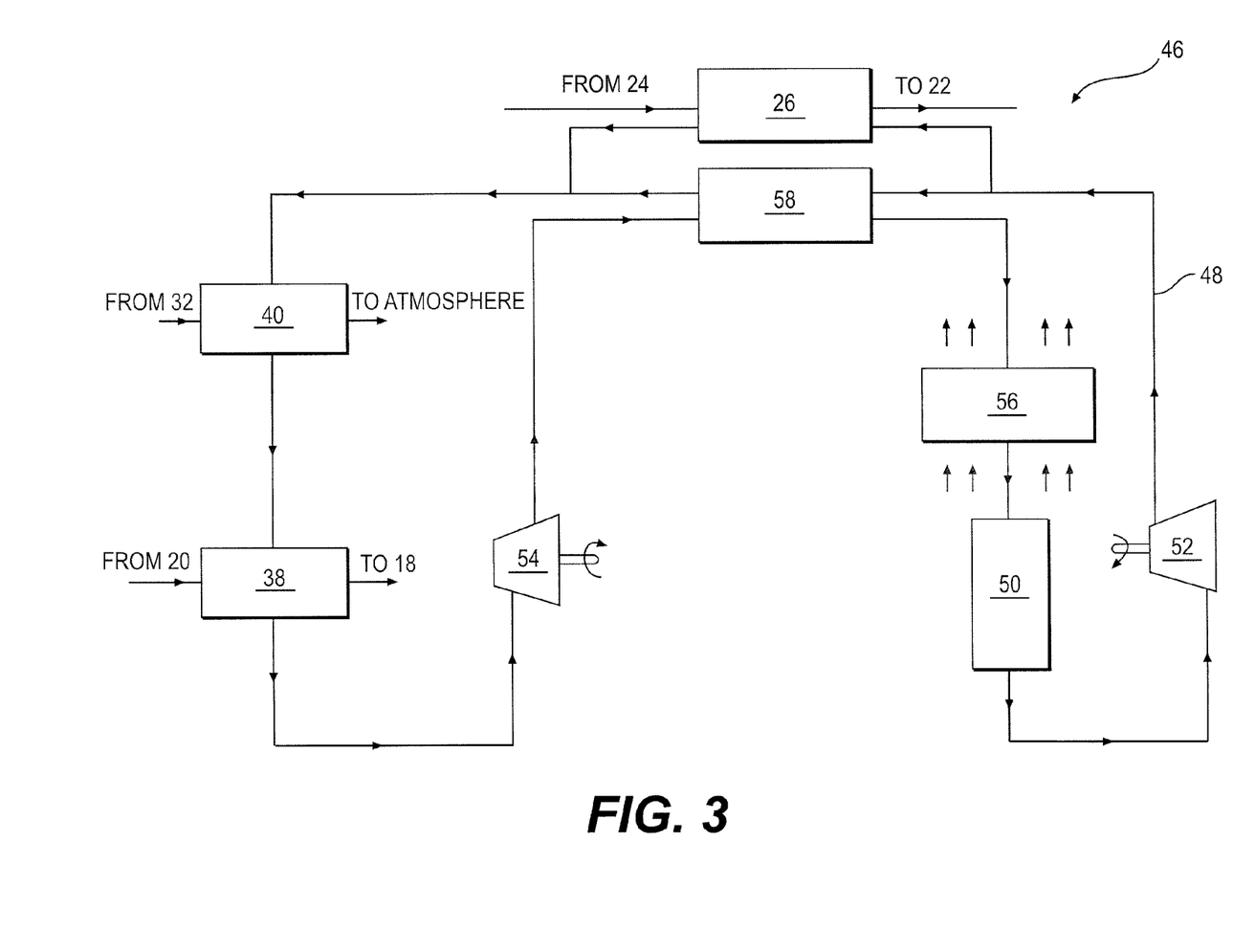

FIG. 3 illustrates another arrangement having three sources of heat input to ERA 46, including aftercooler 26, EGR cooler 38, and exhaust cooler 40. Aftercooler 26 and EGR cooler 38 may be disposed in the same general locations shown in the arrangement of FIG. 2 relative to the remaining components of ERA 46. Exhaust cooler 40 may be disposed in series and between aftercooler 26 and EGR cooler 38. The working fluid inlet temperature of exhaust cooler 40 may be about 450° F., while the working fluid outlet temperature may be about 650° F. These temperatures are between the temperatures of aftercooler 26 and EGR cooler 38, but much closer to the temperatures of EGR cooler 38 than to the temperatures of aftercooler 26. Accordingly, the location of exhaust cooler 40, between aftercooler 26 and EGR cooler 38, may result in a greatest amount of heat transfer from the low-pressure coolant to the working fluid within ERA 46.

Figure 4:
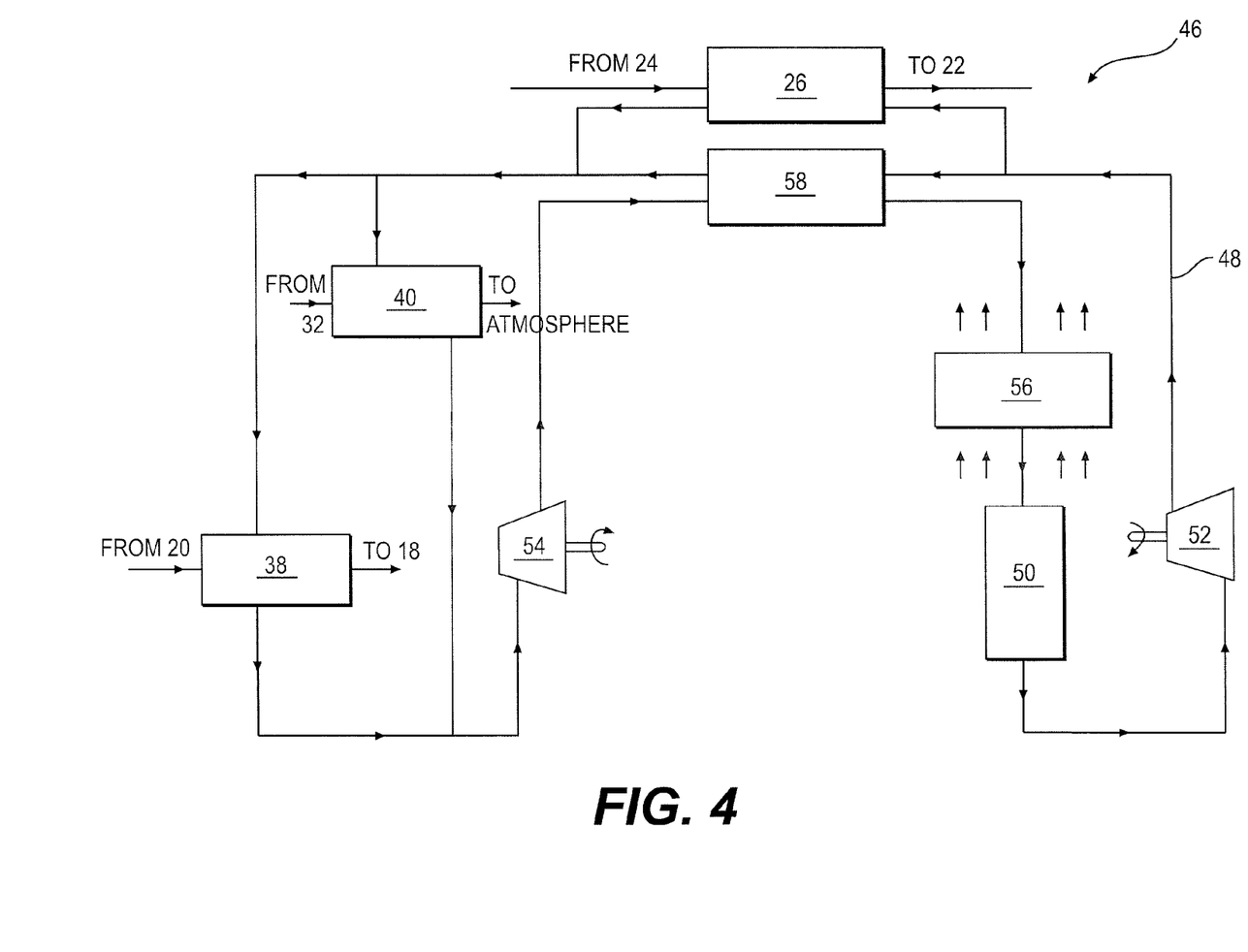

Similar to the arrangement of FIG. 3, the arrangement of FIG. 4 also includes three sources of heat (aftercooler 26, EGR cooler 38, and exhaust cooler 40). However, in contrast to the arrangement of FIG. 3, exhaust cooler 40 of FIG. 4 is shown as being disposed in parallel with EGR cooler 38. In this position, exhaust cooler 40 may have less of an effect on the amount of heat transfer taking place within EGR cooler 38. That is, exhaust cooler 40 may not have already warmed the working fluid prior to the working fluid entering EGR cooler 38, thereby increasing a total amount of heat transfer occurring within ERA 46.

Figure 5:
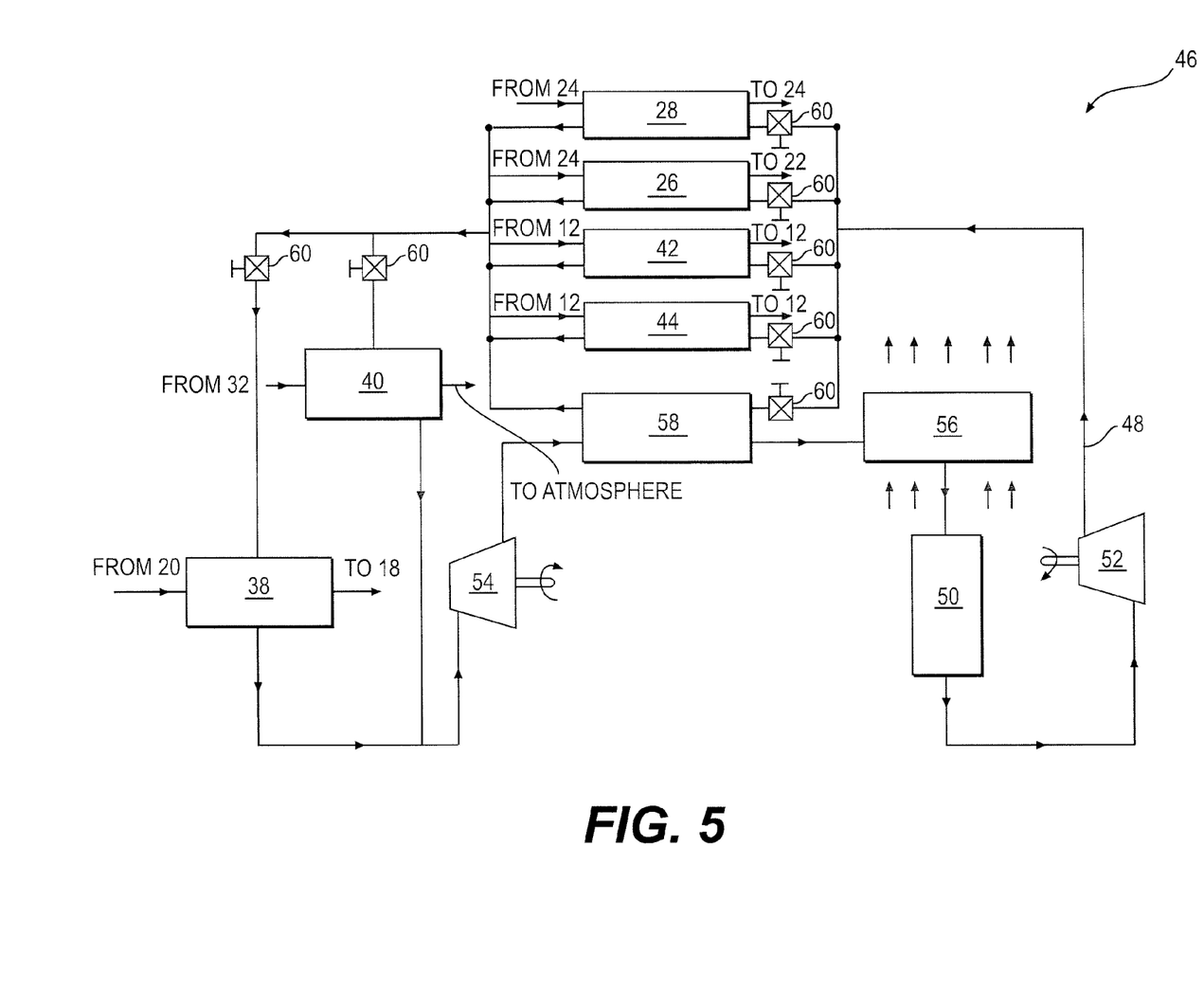

A final arrangement of ERA 46 is illustrated in FIG. 5. In this arrangement, six different heat sources are shown, including aftercooler 26, intercooler 28, EGR cooler 38, exhaust cooler 40, oil cooler 42, and jacket water cooler 44. Working fluid inlet and outlet temperatures of intercooler 28, oil cooler 42, and jacket water cooler 44 may be, for example, about 200-250/300-330° F., 230/300° F., 165/180-200° F., respectively. It should be noted that a greater number, lesser number, and/or different types of coolers may be included in this arrangement, if desired. The coolers, functioning as boilers in ERA 46, may be divided into two separate groups of parallel boilers including a low-temperature group (aftercooler 26, intercooler 28, oil cooler 42, and jacket water cooler 44) located upstream of a high-temperature group (EGR cooler 38 and exhaust cooler 40). In general, the working fluid temperatures of the high-temperature group of boilers may be about 2-3 times hotter than the working fluid temperatures of the low-temperature group of boilers. For the same reasons stated above, the arrangement of boilers having similar temperatures within a parallel group may allow for each of the boilers to have an independent warming effect on the working fluid, while the arrangement of high-temperature boilers located downstream of low-temperature boilers may allow for a greater amount of heat transfer from all of the boilers.

Although shown only in connection with the arrangement of FIG. 5, it is contemplated that one or more valves 60 may be also associated any one or all of the different boiler arrangements of ERA 46. For example, a valve 60 may be located in the working fluid of ERA 46 at locations upstream (shown in FIG. 5) and/or downstream of each boiler. Valve 60 may be a thermostatically or electronically controlled valve that is movable to any position between a flow-passing and flow-blocking position to control a flow rate of the working fluid through the respective boiler. In this manner, the temperature of the low-pressure coolant and/or the working fluid may be regulated to improve a performance and/or efficiency of power system 10.

INDUSTRIAL APPLICABILITY

The disclosed energy recovery arrangement may be implemented into any power system application where charged air induction and/or exhaust gas recirculation are utilized. The disclosed energy recovery system may utilize heat from coolers normally associated with most power system applications to generate a more useful form of energy before the heat is dissipated to the environment, thereby improving an efficiency of the power system. In addition, the disclosed energy recovery arrangement may reduce cooling requirements of the associated power system through the conversion of heat to useful energy. The operation of power system 10 and ERA 46 will now be described.

As shown in FIG. 1, during operation of power system 10, combustion air may be drawn into compressors 24 of turbochargers 35 and pressurized. This pressurized air may be directed from compressor 24 through intercooler 28 and/or aftercooler 26, where heat may be absorbed from the air, and into induction manifold 22. The chilled and pressurized air may then flow into combustion chambers 16 to mix and combust with fuel to generate a mechanical power output and a flow of hot exhaust gases.

The exhaust flow from power system 10 may pass through exhaust manifold 30 and into turbines 32 of turbochargers 35, thereby driving compressors 24 to pressurize more air. Some of the exhaust from turbochargers 35 may then pass through EGR loop 36 back into air induction system 18, while the remaining exhaust may be discharged to the atmosphere. Heat from one or both flows of the exhaust may be captured within EGR and exhaust coolers 38, 40.

During the combustion process described above, additional heat may be absorbed by engine block 12 and passed to jacket water and lubricating oil circulating through block 12. This heat may be captured via jacket water and oil coolers 42, 44, respectively.

ERA 46 may function to convert the heat captured from power system 10 back into useful energy. Specifically, as shown in FIGS. 2-5, pump 52 may pressurize the working fluid in ERA 46 and direct the fluid through the group of low-temperature boilers (i.e., coolers of power system 10) in parallel, where each of the boilers independently transfers heat from their corresponding low-pressure coolants to the working fluid of ERA 46. This heated working fluid may then pass through the high-temperature boilers (i.e., coolers of power system 10), where additional heat may be imparted to the fluid causing the fluid to superheat. From the high-temperature boilers, the superheated working fluid may then expand within energy extractor 54, thereby driving energy extractor 54 to generate a more-useful form of energy. The working fluid, now at a lower energy level but still in vapor form, may pass through recuperator 58, thereby transferring some heat to the working fluid entering the high-temperature boilers in liquid form to facilitate vaporization of the fluid. After passing through recuperator 58, the working fluid vapor may condense back to liquid within condenser 56 and be collected within supply 50.

The arrangement of boilers in ERA 46, in conjunction with the location of recuperator 58, may provide several benefits. For example, by co-locating boilers having similar temperatures together with recuperator 58 inside a parallel group may allow for each of the boilers and the recuperator to have independent heating effects on the working fluid. In addition, the location of high-temperature boilers downstream of the low-temperature boilers and the recuperator may allow for a greater amount of heat transfer into the working fluid.

It will be apparent to those skilled in the art that various modifications and variations can be made to the disclosed energy recovery arrangement. Other embodiments will be apparent to those skilled in the art from consideration of the specification and practice of the disclosed energy recovery arrangement. It is intended that the specification and examples be considered as exemplary only, with a true scope being indicated by the following claims and their equivalents.

What is claimed is:

1. An energy recovery arrangement for an engine, comprising:
   a closed circuit containing a high-pressure working fluid;
   a first boiler disposed within the closed circuit and configured to receive waste heat from a first source on the engine, wherein the first source is recirculated exhaust gas;
   a second boiler disposed within the closed circuit at a location upstream of the first boiler and configured to receive waste heat from a second source on the engine;
   a third boiler disposed within the closed circuit and configured to receive waste heat from a third source on the engine, wherein the third source is a main exhaust flow of the engine;
   an energy extractor disposed within the closed circuit at a location downstream of the first and second boilers;
   a condenser disposed within the closed circuit at a location downstream of the energy extractor;
   a pump disposed within the closed circuit at a location downstream of the condenser and upstream of the first and second boilers; and
   a recuperator disposed within the closed circuit in parallel with the second boiler and configured to transfer heat from working fluid exiting the energy extractor to working fluid exiting the pump.

2. The energy recovery arrangement of claim 1, wherein the second source is charge air entering the engine.

3. The energy recovery arrangement of claim 1, wherein the recirculated exhaust gas exits the first boiler as a vapor.

4. The energy recovery arrangement of claim 1, wherein the energy extractor is a turbine.

5. The energy recovery arrangement of claim 1, wherein the second boiler transfers less heat to the working fluid than the first boiler.

6. The energy recovery arrangement of claim 1, wherein inlet and outlet temperatures of the second boiler and the recuperator are about the same.

7. The energy recovery arrangement of claim 6, wherein inlet and outlet temperatures of the first boiler are about 2-3 times higher than the inlet and outlet temperatures of the second boiler and recuperator.

8. The energy recovery arrangement of claim 1, wherein the third boiler is disposed in series with the first boiler.

9. The energy recovery arrangement of claim 1, wherein the third boiler is disposed in parallel with the first boiler.

10. The energy recovery arrangement of claim 1, further including a tank disposed between the condenser and the pump and configured to hold a liquid supply of the working fluid.

11. The energy recovery arrangement of claim 1, wherein the third boiler is disposed in parallel with the second boiler and the recuperator.

12. The energy recovery arrangement of claim 11, wherein the third boiler includes at least one of an intercooler, an oil cooler, and a jacket water cooler.

13. The energy recovery arrangement of claim 11, further including a valve associated with each of the first, second, and third boiler and configured to move between flow-passing and flow-blocking positions.

14. A method of recovering energy, comprising:
pressurizing a working fluid;
directing the pressurized working fluid through a low-temperature boiler and a high-temperature boiler in series to vaporize the working fluid, and directing the pressurized working fluid through at least one additional boiler;
wherein the low-temperature boiler, the high-temperature boiler, and the at least one additional boiler each receive heat from a respective heat source, the heat source associated with the high temperature boiler being recirculated exhaust gas and the heat source associated with the at least one additional boiler being a main exhaust flow of an engine;
extracting energy from the vaporized working fluid;
transferring heat from the vaporized working fluid to the pressurized working fluid at a location upstream of the high-temperature boiler and in parallel with the directing of pressurized working fluid through the low-temperature boiler; and
condensing the working fluid after extracting energy.

15. The method of claim 14, wherein the at least one additional boiler is in parallel with the low-temperature boiler.

16. The method of claim 14, wherein;
the low-temperature boiler is associated with an aftercooler of an engine;
the high-temperature boiler is associated with an exhaust gas recirculation loop of the engine;
the at least one additional boiler is associated with at least one of an intercooler, an oil cooler, and a jacket water cooler;
the inlet and outlet temperatures of the low-temperature and at least one additional boilers are about the same; and
the high-temperature boiler has inlet and outlet temperatures about 2-3 times higher than the inlet and outlet temperatures of the low-temperature and at least one additional boilers.

17. An engine, comprising:
an engine block at least partially forming a combustion chamber;
a compressor configured to pressurize air directed into the combustion chamber;
an aftercooler configured to cool the pressurized air;
a turbine driven by exhaust from the combustion chamber to rotate the compressor;
an exhaust gas recirculation loop configured to direct exhaust from downstream of the turbine into the compressor;
an exhaust cooler configured to cool exhaust in the exhaust gas recirculation loop;
a closed circuit containing a high-pressure working fluid and connected to receive heat from the aftercooler and the exhaust cooler in series;
an energy extractor disposed within the closed circuit at a location downstream of the air and exhaust coolers;
a condenser disposed within the closed circuit at a location downstream of the energy extractor;
a pump disposed within the closed circuit at a location downstream of the condenser and upstream of the air and exhaust coolers; and
a recuperator disposed within the closed circuit in parallel with the aftercooler and configured to transfer heat from working fluid exiting the energy extractor to working fluid exiting the pump.

18. An energy recovery arrangement for an engine, comprising:
a closed circuit containing a high-pressure working fluid;
a first boiler disposed within the closed circuit and configured to receive waste heat from a first source on the engine;
a second boiler disposed within the closed circuit at a location upstream of the first boiler and configured to receive waste heat from a second source on the engine;
at least a third boiler disposed in parallel with the second boiler and the recuperator and configured to receive waste heat from at least a third source on the engine;
a valve associated with each of the first, second, and at least a third boiler and configured to move between flow-passing and flow-blocking positions;
an energy extractor disposed within the closed circuit at a location downstream of the first and second boilers;
a condenser disposed within the closed circuit at a location downstream of the energy extractor;
a pump disposed within the closed circuit at a location downstream of the condenser and upstream of the first and second boilers; and
a recuperator disposed within the closed circuit in parallel with the second boiler and configured to transfer heat from working fluid exiting the energy extractor to working fluid exiting the pump.

* * * * *